United States Patent [19]

Wimmer et al.

[11] 3,891,222

[45] June 24, 1975

[54] STYLUS RECONDITIONING DEVICE

[75] Inventors: Günter Wimmer; Jürgen Wilisch; Jürgen Heller, all of Berlin, Germany

[73] Assignee: TED Bildplatten Aktiengesellschaft AEG-Telefunken-Teldec, Zug, Switzerland

[22] Filed: Aug. 29, 1974

[21] Appl. No.: 502,235

[30] Foreign Application Priority Data

Aug. 29, 1973 Germany ........................... 2344105

[52] U.S. Cl. ................. 274/1 R; 274/13 R; 274/38; 274/45

[51] Int. Cl. .......................................... G11b 31/00

[58] Field of Search ............. 274/1 R, 10 E, 45, 37, 274/38; 51/71

[56] References Cited

UNITED STATES PATENTS

| | | | |
|---|---|---|---|
| 2,181,285 | 11/1939 | Schuler | 51/71 |
| 2,244,506 | 6/1941 | Staszkiewiecz | 274/1 R |

*Primary Examiner*—Richard E. Aegerter
*Assistant Examiner*—Larry Jones
*Attorney, Agent, or Firm*—Spencer & Kaye

[57] ABSTRACT

A signal reproducing apparatus has a support for a signal carrier body and a carriage moved with respect to the signal carrier body. The carriage supports a stylus which, during signal reproduction, contacts the signal carrier body. To the carriage there is further secured a grinding member and a mechanism is provided for relatively moving the stylus and the grinding member into contact with one another for reconditioning the stylus during pauses of signal reproduction.

6 Claims, 6 Drawing Figures

PATENTED JUN 24 1975 3,891,222

SHEET 3

STYLUS RECONDITIONING DEVICE

BACKGROUND OF THE INVENTION

In signal reproducing apparatuses of the type that mechanically sense signals encoded on a disc-shaped carrier it has been necessary to periodically recondition the pickup stylus in order to compensate for the changes brought about by mechanical wear. In this manner it is sought to ensure a satisfactory quality of the subsequently reproduced signals as well.

A reconditioning process for the reestablishment of optimal quality of reproduction has to be effected during the pauses of reproduction because only during these periods is that portion of the stylus accessible which actually contacts the signal carrier. In known apparatus the stylus has to be brought into a predetermined starting position which in most cases corresponds to its position of rest.

If a signal reproducing apparatus of the above-outlined type is used, for example, together with a changing mechanism which advances in succession the signal carrier bodies to the replaying (signal reproducing) apparatus, it is a desideratum to maintain the pauses between the changing of the signal carriers and thus the interruption of signal reproduction, at the smallest possible value. If it is necessary to recondition (grind) the stylus after playing one or more signal carriers, the time required for the reconditioning of the stylus is added to the time necessary for resetting the stylus into its initial position (which is at the lead-in groove in case of disc-shaped signal carriers). The period which is necessary for resetting the stylus and for subsequently reconditioning it may well exceed the period necessary for changing the signal carrier. Thus, efforts to shorten the pause between signal reproduction from two successive signal carriers have to be directed to the shortening of the period that is necessary for the reconditioning and resetting of the pickup stylus.

SUMMARY OF THE INVENTION

It is an object of the invention to provide an improved signal reproducing apparatus of the above-outlined type in which despite the use of a device for the reconditioning of the stylus during pauses between the automatic or manual changing of the individual signal carriers, the period necessary for the changing of the signal carrier is maintained very short.

This object and others to become apparent as the specification progresses, are accomplished by the invention, according to which, briefly stated, the signal reproducing apparatus has a carriage moved with respect to a signal carrier body. The carriage supports a stylus which, during signal reproduction, contacts the signal carrier body. To the carriage there is secured a grinding member and a mechanism for relatively moving the stylus and the grinding member into contact with one another for reconditioning the stylus during pauses of signal reproduction.

It is a particular advantage of the invention that a reconditioning of the stylus can be effected not only when it dwells in its starting position, but also during pauses in the signal reproduction from one and the same signal carrier without the necessity of returning the stylus into its starting position.

DESCRIPTION OF THE PREFERRED EMBODIMENT

Figures 1, 2:
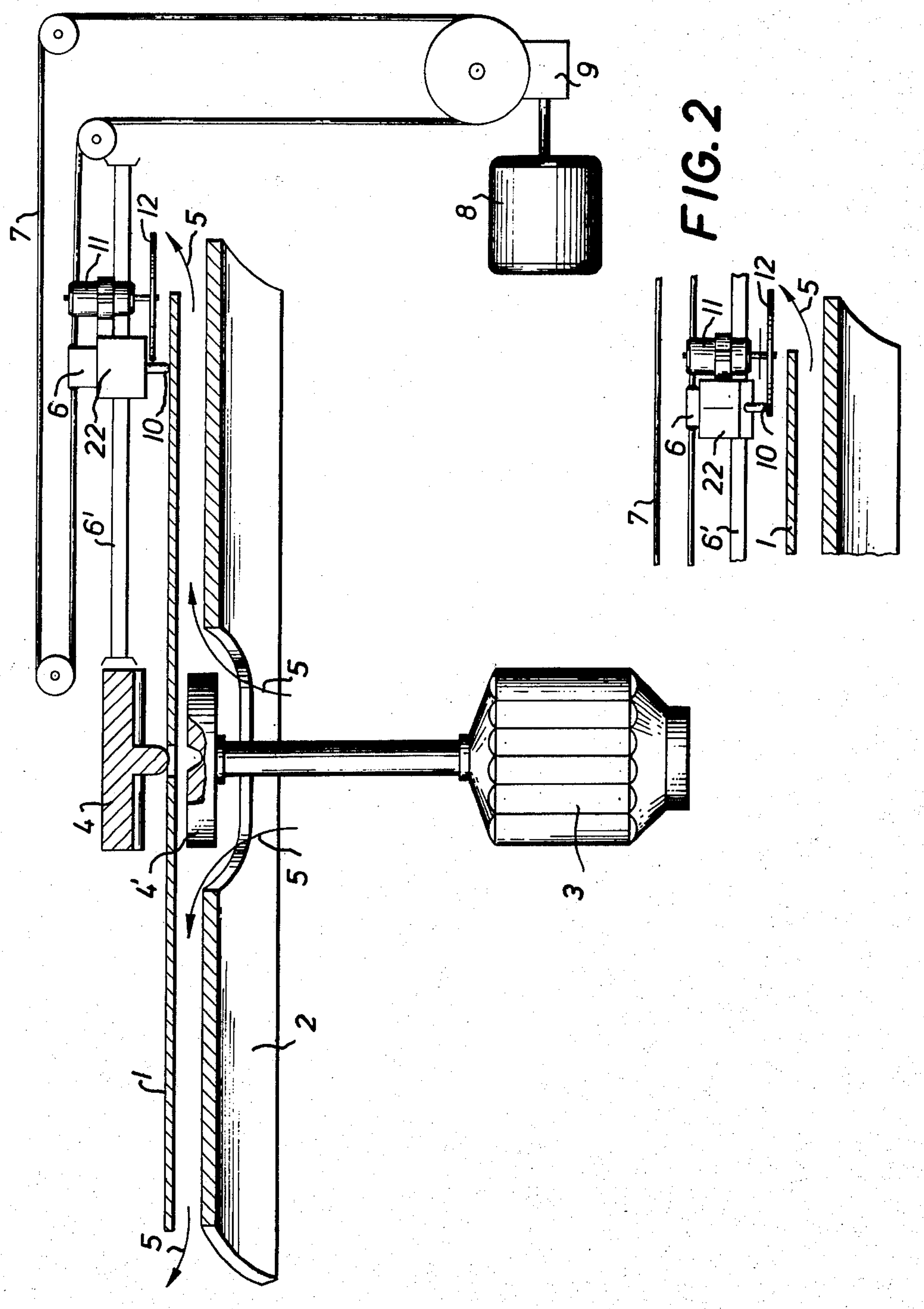
FIG. 1 is a schematic sectional side elevational view of a preferred embodiment of the invention in the signal reproducing position, while the stylus reconditioning device is in its position of rest.
FIG. 2 is a schematic fragmentary sectional side elevational view of the same embodiment depicting the illustrated components during the period of stylus reconditioning.

Turning now to FIG. 1, there is shown a disc-like signal carrier body 1 which is rotated above a stationary support member 2 by a drive motor 3 via a drive member 4 and a counter plate 4'. For better visibility of the components, the drive member 4 is illustrated in a lifted, inoperative position. In its driving position, the nose portion of the driving member 4 extends into the counter plate 4' directly driven by the motor 4 and is thus rotated by virtue of frictional engagement. The signal carrier 1 rotates on an air cushion generated by an air stream 5. A pickup device including a stylus 10 is secured to a carriage 6 and is, by the latter, for the purpose of reproducing the signals encoded on the signal carrier 1, guided by a cable 7 driven by means of a drive motor 8 via a gear 9. The carriage 6 and thus the stylus 10 are guided radially with respect to the grooves which are provided on the signal carrier 1 and in which the signals are stored. In case the grooves have a constant pitch, the carriage 6 is driven with a uniform speed. The carriage 6 is mounted for sliding motion on a stationary rail 6'.

To the carriage 6 there is secured, by means of a pivoting mechanism, a drive motor 11 with a grinding disc 12. The structure and function of the pivoting mechanism will be discussed later in detail as the specification progresses. In FIG. 1 the drive motor 11 and the grinding disc 12 rotated thereby are illustrated in their position of rest which they assume when the stylus 10 is in contact with the signal carrier 1. The pickup device proper, including the stylus 10, is disposed in a holder 22 which, in turn, is affixed to the carriage 6.

FIG. 2 illustrates a detail of FIG. 1, including the stylus 10 supported in the holder 22 and the drive motor 11 with the grinding disc 12. FIG. 2 depicts the operational step when, upon termination of a signal reproducing phase, the stylus 10 is lifted off the signal carrier 1 and is in engagement, for the purpose of reconditioning, with the grinding disc 12. The latter, for this purpose, has been shifted towards the left in a pivotal motion. Details of the mechanism that lifts the stylus 10 will also be discussed later. By observing the subsequent operational phases as illustrated in the schematic representations of FIGS. 1 and 2, the basic purpose of the invention will be recognized, namely the endeavor to grind the stylus as soon as possible after it has been lifted off the signal carrier. By virtue of the fact that the grinding device — that is, the drive motor 11 and the grinding disc 12 — is, together with the holder 22, secured to the carriage 6, a grinding of the stylus 10 may occur already during the period the stylus 10 is being moved towards its starting position; it is thus not necessary to wait with the starting of the reconditioning operation until the initial, reset position of the stylus 10 has been reached.

Figure 3:
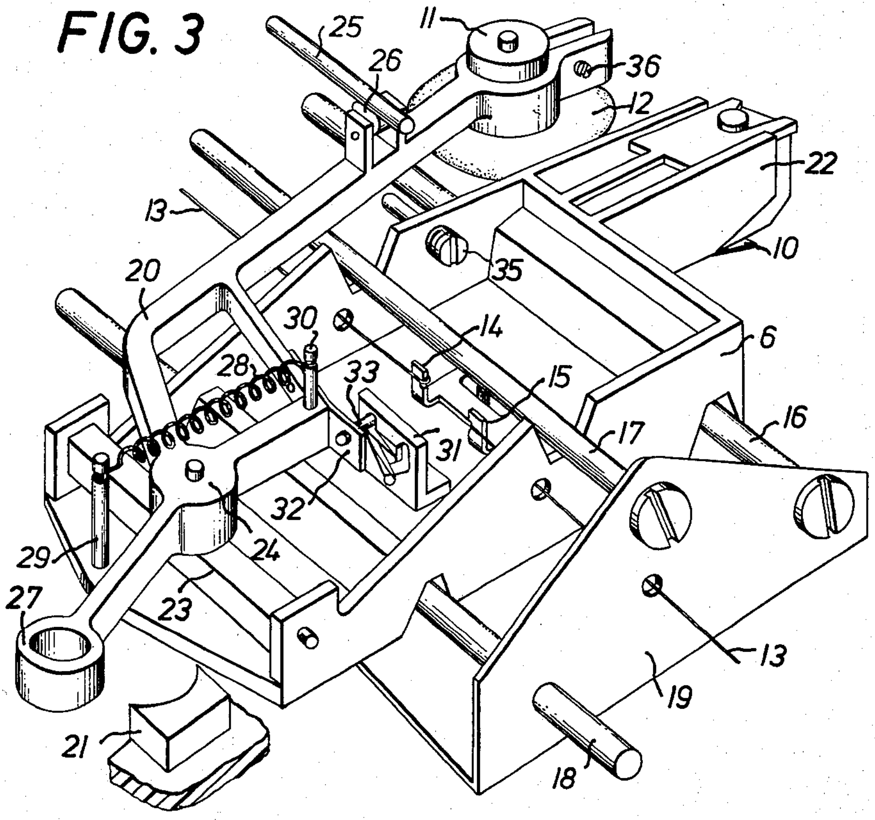
FIG. 3 is a detailed perspective view of the stylus reconditioning device proper.

Turning now to FIG. 3, there is shown in detail the structure of the carriage 6 and related components which support and move the stylus 10 and the reconditioning (grinding) mechanism 11, 12. The carriage 6 is driven by a cable 13 (corresponding to cable 7 of FIG. 1) which is moved by a motor (such as motor 8 of FIG. 1) as a function of the groove pitch and which is looped around hooks 14 and 15 of the carriage 6.

After the termination of a signal reproducing period, the stylus 10 is lifted with its holder 22 from the signal carrier 1 and is, together with the carriage 6, moved with increased speed into its starting position by virtue of reversal of the pulling force exerted on the cable 13.

The entire carriage 6 is arranged to glide on three parallel guide rods 16, 17 and 18 which are held together in a rod holding bracket 19. For lifting the stylus 10 from the signal carrier 1, the carriage 6 is, together with the bracket 19, tilted in a vertical plane about the axis of the rotatably supported guide rod 18.

The drive motor 11 is mounted on a lever 20 adjacent the holder 22 which supports the stylus 10. The grinding disc 12 serving to recondition the stylus 10 is fastened to the output shaft of the high-speed drive motor 11. The lever 20 is pivotally supported by a pin 24 which, in turn, is affixed to an axle 23 which itself is pivotally held in a bracket-like extension of the carriage 6. Thus, the lever 20 is pivotal in a horizontal plane about pin 24 and in a vertical plane about the axle 23. In this manner it is possible to move the grinding disc 12 from below towards the holder 22 at the underside of which there is mounted the stylus 10. The grinding disc 12 has one or more grinding grooves (not shown) which, during the reconditioning of the stylus 10 receive and contact the latter.

According to the invention the stylus 10 is reconditioned by the grinding disc 12 during those pauses in the signal reproduction which are necessitated by the changing of the signal carriers. For the reconditioning there is utilized particularly the period during which the holder 22 and thus the stylus 10 are returned into the starting position. The preferred embodiment advantageously utilizes the tilting motion of the carriage 6 necessary for lifting the stylus 10 from the signal carrier, to move the grinding disc 12 towards the stylus 10 as it will now be described in more detail.

It is assumed that during signal pickup the holder 22 is, together with the carriage 6, moved towards the right with respect to the bracket 19 as viewed in FIG. 3. After a signal indicates the end of the recorded signals on the signal carrier 1, there is caused by conventional control means, not illustrated, a pivotal motion of the bracket 19 about the axis of the guide rod 18 in a counterclockwise direction as viewed in FIG. 3, thus causing an upward motion of the holder 22. In case an automatic record changer is used, these control means include expediently a control disc having camming grooves into which extend follower pins, the motion of which is transmitted to actuating components. In case of a manually operated apparatus, these movements may be manually effected by the operating personnel. The signal which indicates the end of the encoding on the signal carrier may be either a groove of an increased pitch — which is well-known in sound records — or it is a modulated signal contained in the recording. Since the lever 20 engages, through a roller 25, a stationary guide rod 26 upon counterclockwise tilting of the carriage 6, the lever 20 is tilted about the axis of the axle 23, so that the grinding disc 12 is lowered with respect to the holder 22 as the carriage 6 tilts. Stated differently, during the pivotal motion of the carriage 6 in the vertical plane, the angular displacement of the lever 20 is smaller in the vertical plane than the angular displacement of the carriage 6 in the same plane. The carriage 6 is further moved along rods 16, 17, 18 — as during signal reproduction — by a predetermined distance. In this manner, the terminus 27 of the lever 20 abuts a stationary stop 21. If now the carriage 6 is further moved along rods 16, 17, 18, the grinding disc 12 swings towards the holder 22 but is, at this point, still above the stylus 10. The effect of a tension spring 28, which is attached to a pin 29 affixed to the carriage 6 and a pin 30 affixed to the lever 20, aids the above-described pivotal motion of the lever 20 towards the holder 22. The tension spring 28 is disposed in such a manner that it exerts no torque on the lever 20 when the latter is in its normal position. Thus, the tension spring 28 is in an unstable position of equilibrium. If, however, the grinding disc 12 is pivoted towards the holder 22, the pin 30 swings outwardly and the tension spring 28 seeks to support this motion, so that the grinding disc 12 moves further in the direction of the holder 22 without the necessity of exerting further pressure on the end of the lever 20. For improving the guidance of the lever 20 there is further provided a pin 33 which is connected with the lever 20 by means of a leaf spring 32 and which projects into a guiding device 31.

Figure 4:
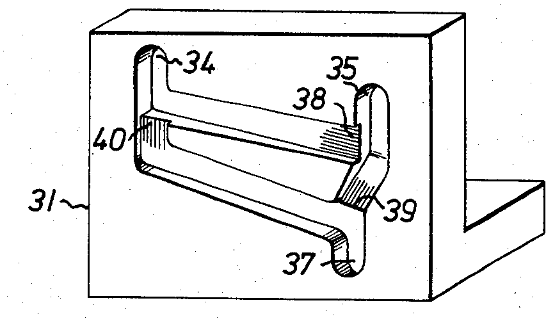
FIG. 4 is a schematic front elevational view of a detail of FIG. 3.

FIG. 4 illustrates the guide 31 in detail. When the stylus 10 is in its lowered position, the pin 33 is disposed within the guide 31 at position 34. When the grinding disc 12 is — as described above — lowered and pivoted towards the stylus 10, the pin 30 shifts to position 35. The enlarged guide walls in the zone of position 35 provide a free space that surrounds position 35 and that is designed in such a manner that the position of the grinding disc 12 in the lateral direction is not accurately determined by the guide 31. For the exact positioning of the grinding disc 12 in the horizontal direction there serves an abutment screw 35, (FIG. 3) by means of which the grinding disc 12 may be adjusted in the horizontal direction. For the vertical adjustment of the grinding disc 12 there is provided a clamping screw 36 (FIG. 3).

The grinding disc 12 assumes its terminal operating position — that is, the position in which one of the grinding grooves in the grinding disc 12 is in contact with the stylus 10 — only after the stylus 10 is again lowered slightly. This occurs by virtue of the pivotal motion of the bracket 19 about the guiding rod 18. This motion is triggered by a central control device not illustrated.

From the time the stylus 10 is lifted from the signal carrier 1, a changing device may remove the played signal carrier and replace it by an unplayed one. During this period the holder 22 is, together with the carriage 6, moved leftward into its starting position by the cable 13. At the same time, the grinding disc 12 effects a reconditioning grinding of the stylus 10. When the holder 22, together with the stylus 10 again reaches its starting position over the lead-in groove of the new signal carrier, the holder 22 is again lifted by virtue of a pivotal motion of the bracket 19. The pin 33 now glides into the position 37 of the guide 31. A backward gliding of the pin 33 into the position 34 is prevented by virtue of a ramp 38, the steeply sloping edge of which faces the position 35. The grinding disc 12 is moved away from the stylus 10 downwardly and is at the same time pivoted leftward. If before the beginning of the signal pickup from the new signal carrier the stylus 10 is again lowered, the pin 33 is guided back from the position 37 into the position 34 by the sliding guide 31. A backward slide into the position 35 is prevented by a further ramp 39, the steeply sloping edge of which faces the position 37. If the holder 22 is permanently lowered with the stylus 10, the pin 33 assumes again its position 34, in which extreme position the pin is prevented from shifting by a further ramp 40 the steep edge of which faces the position 34. In this manner, the grinding disc 12 is again returned into its starting position (position of rest), whereupon the signal reproduction from the new signal carrier, which has in the meantime been placed in position, may start without delay.

In certain cases it may be desired to recondition the stylus 10 before the terminus 27 approaches the abutment 21. Such may be the case, for example, in the still image reproduction of television signals from video discs in which the stylus repeatedly travels in a limited number of grooves of the signal carrier and is thus submitted to particularly significant wear. Such reconditioning may take place as the stylus 10 is positioned above and at a distance from the signal carrier during pauses of signal reproduction as the stylus 10 is lifted by the pivotal motion of the bracket 19 and the above-described motions of the lever 20 are executed.

According to another embodiment of the invention, during the return motion of the stylus it is the latter which moves toward the grinding disc rather than moving the grinding disc toward the stylus as it is the case in the previously described embodiment. Such a solution may be effected, for example, by means of pivoting the stylus 10 90° towards a vertically oriented grinding disc. It is noted that if, for example, an exact adjustment of the stylus is of important consideration, the first-described embodiment may be preferred. From the point of view of spatial considerations it may, however, be often more advantageous to move the stylus towards a grinding disc which is stationary with respect to the carriage.

Figure 5:
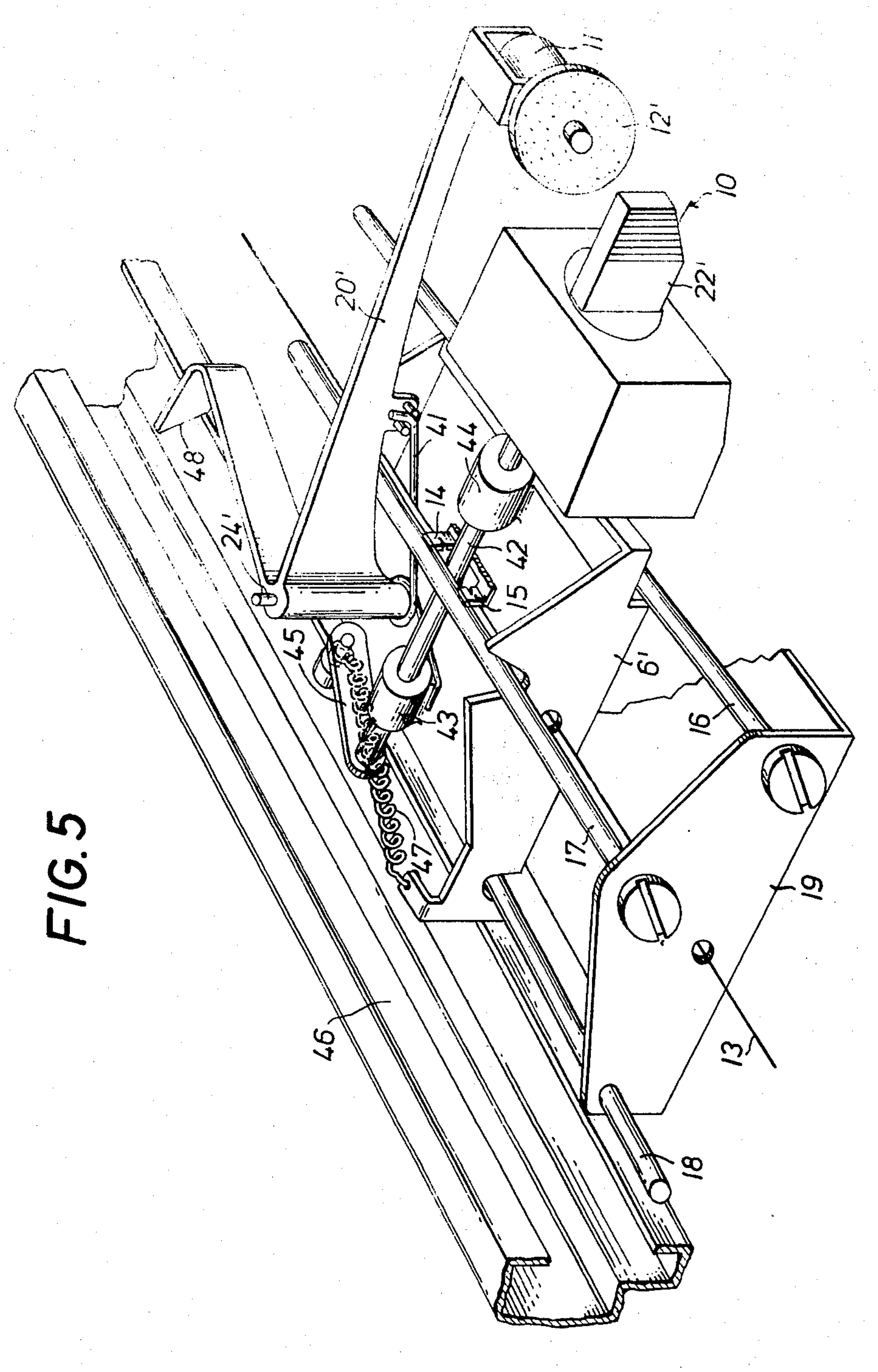
FIGS. 5 and 6 are detailed perspective views of another embodiment of a reconditioning device shown in different positions.
Figure 6:
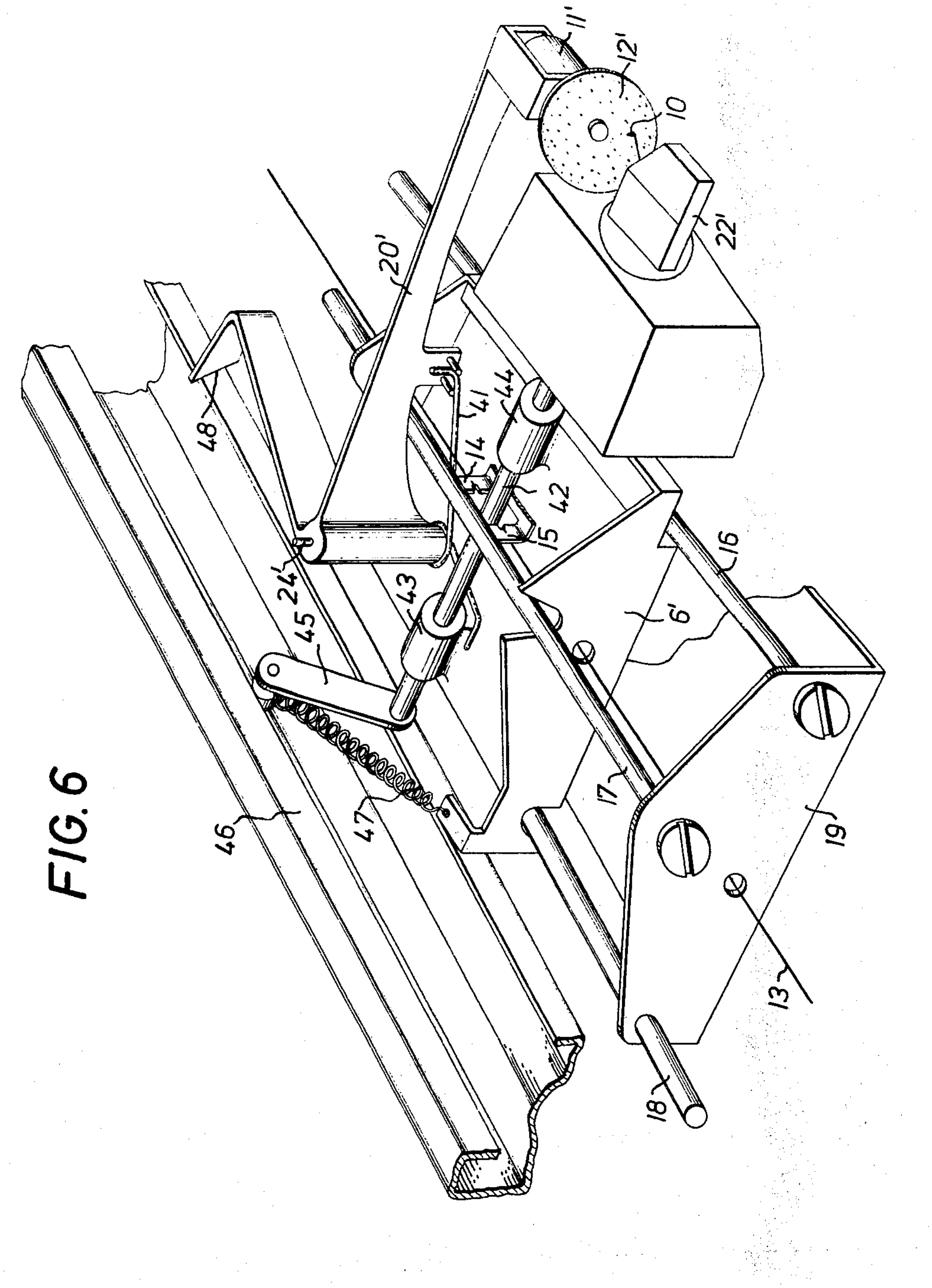

FIGS. 5 and 6 are illustrating such an embodiment of the invention, where the stylus is moved towards the grinding disc by pivoting the stylus 90° towards the vertically oriented grinding disc 12'. The stylus is shown in its normal operating position (with respect to carriage 6') in FIG. 5. The reconditioning position of the stylus 10 is shown in FIG. 6, which is illustrating the embodiment of FIG. 5 with the grinding disc 12' in its operating position. It may be remarked that in this embodiment the grinding disc is also moving a little bit towards the stylus 10 after the latter has been pivoted 90°. Thus the pivoting of the stylus 10 is unobstructed by the grinding disc 12' and the stylus 10 does not engage the grinding disc 12' before having reached its final position.

Turning now to FIG. 5 again, there is shown in detail the structure of the carriage 6' and the components supporting and moving the stylus 10 and the reconditioning (grinding) mechanism 11', 12'. The drive mechanism and the function of the carriage 6' is similar to that of carriage 6 in FIGS. 1 and 3. Especially the lifting of the stylus 10 after the termination of a signal reproducing period and the returning into its starting position by means of the elements having the reference numerals 13 to 19 has been explained with reference to FIG. 3 already.

The drive motor 11' is mounted on a lever 20' adjacent to the holder 22' which supports the stylus 10. The grinding disc 12' serving to recondition the stylus 10 is fastened to the output shaft of the high speed drive motor 11'. The angular lever 20' is pivotally supported by a pin 24' which, in turn is affixed to the carriage 6'. Thus the angular lever 20' is pivotal in a horizontal plane about pin 24'. The holder 22' is connected to the shaft 42 which is pivotally supported by means of the bearings 43 and 44. A lever 45 is attached to the end of the shaft 42 by means of which the stylus 10 can be pivoted 90°, thus being exposed to the grinding disc 12'. The lever 45 is operated by means of edges of a profile element 46 which can be moved in vertical direction. One of the inner edges of the profile element 46 engages the end of the lever 45 if the profile element 46 is being moved in an upward or downward direction, respectively.

The tension spring 47 is disposed in such a manner that it tends to turn the angular lever 20' into its extreme position, limited by the inner edges of the profile element 46. For the pivoting of the stylus 10 the end of the lever 45 has to be displaced beyond the dead center of tension spring 47, by moving the profile element 46 upwards or downwards, respectively, to automatically let turn the lever 45 to its other extreme position limited by the opposite inner edge of the profile element 46 by means of tension spring 47 which is seeking to support this movement.

Thus the stylus can be switched from its operating to its reconditioning position by just moving the profile element 46 upwards or downwards. This motion is triggered by a central control device not illustrated.

The pivoting of the stylus 10 is not sufficient to bring it into contact with the grinding disc 12', because for the final engagement the direction of the relative movement of stylus 10 and grinding disc 12' must be parallel to the axis of the grinding disc 12' to enable the stylus 10 to engage one of the grinding grooves.

Therefore one end of the angular lever 20' bears a ramp 48 which is contacting the lower edge of the profile element under the force of the annular spring 41, one end of which is tending to turn the angular lever into a direction which causes the moving of the grinding disc 12' away from stylus 10. When the profile element is raised and the stylus pivoted towards the grinding disc 12' the final movement of the latter towards the stylus is caused by the ramp 48 turning the angular lever 20' against the tension of the annular spring 41 for a small angle, sufficient for the grinding disc 12' to contact the stylus 10, for reconditioning. As soon as the profile element 46 is lowered again the grinding disc 12' is removed from the stylus and the stylus resumes its operating position as is has been described already.

It will be understood that the above description of the present invention is susceptible to various modifications, changes and adaptations, and the same are intended to be comprehended within the meaning and range of equivalents of the appended claims.

What is claimed is:

1. In a signal reproducing apparatus including means for supporting a signal carrier body; a signal pickup stylus mechanically contacting the signal carrier body during signal reproduction; a mechanism for moving the stylus with respect to the signal carrier body during signal reproduction; and grinding means, including a grinding member, for reconditioning the stylus during pauses of signal reproduction, the improvement comprising a. a carriage forming part of said mechanism for moving the stylus;
b. a holder supporting said stylus and mounted on said carriage;
c. means for securing said grinding member to said carriage; and
d. means for relatively moving said stylus and said grinding member into engagement with one another for reconditioning those parts of said stylus that contact the signal carrier body during signal reproduction.

2. An improvement as defined in claim 1, wherein said means for relatively moving said stylus and said grinding member includes means for moving said grinding member into operative engagement with said stylus.

3. An improvement as defined in claim 1, including means for stationarily supporting said grinding member on and with respect to said carriage; said means for relatively moving said stylus and said grinding member including means for moving said stylus into operative engagement with said grinding member.

4. An improvement as defined in claim 2, wherein said means for relatively moving said stylus and said grinding member includes a first means for moving said stylus in a first plane and a second means for moving said grinding member in a second plane, said first and second planes being perpendicular to one another.

5. An improvement as defined in claim 1, wherein said means for relatively moving said stylus and said grinding member includes means for pivoting said carriage for moving said stylus in a first plane; said means for securing said grinding member to said carriage includes a lever having one end carrying said grinding member adjacent said stylus, said lever being pivotally held on said carriage for swinging movement in a second plane perpendicular to said first plane.

6. An improvement as defined in claim 5, further including means for pivotally supporting said lever on said carriage for swinging motion in said first plane; and means for effecting a smaller angular displacement of said lever in said first plane than the angular displacement of said carriage upon pivotal motion of said carriage.

* * * * *